(12) United States Patent
Park et al.

(10) Patent No.: US 9,304,001 B2
(45) Date of Patent: Apr. 5, 2016

(54) POSITION RECOGNITION METHODS OF AUTONOMOUS MOBILE ROBOTS

(71) Applicant: Samsung Electronics Co., Ltd., Suwon-Si, Gyeonggi-Do (KR)

(72) Inventors: Soon Yong Park, Bucheon-si (KR); Kyung Shik Roh, Seongnam-si (KR)

(73) Assignee: Samsung Electronics Co., Ltd, Gyeonggi-Do (KR)

( * ) Notice: Subject to any disclaimer, the term of this patent is extended or adjusted under 35 U.S.C. 154(b) by 0 days.

(21) Appl. No.: 14/187,670

(22) Filed: Feb. 24, 2014

(65) Prior Publication Data

US 2015/0012209 A1    Jan. 8, 2015

(30) Foreign Application Priority Data

Jul. 3, 2013    (KR) .......................... 10-2013-0077668

(51) Int. Cl.
*G01C 21/00* (2006.01)
*G01C 21/20* (2006.01)
*G05D 1/02* (2006.01)

(52) U.S. Cl.
CPC .............. *G01C 21/20* (2013.01); *G05D 1/0231* (2013.01); *G05D 1/0274* (2013.01)

(58) Field of Classification Search
None
See application file for complete search history.

(56) References Cited

U.S. PATENT DOCUMENTS

| | | | |
|---|---|---|---|
| 5,006,988 A * | 4/1991 | Borenstein et al. ............. 701/25 |
| 5,850,352 A * | 12/1998 | Moezzi et al. ................ 345/419 |
| 7,738,883 B2 * | 6/2010 | Hull ............................ 455/456.3 |
| 7,805,220 B2 * | 9/2010 | Taylor et al. .................. 700/253 |
| 2005/0213431 A1 | 9/2005 | Wang et al. |
| 2006/0089765 A1 * | 4/2006 | Pack et al. ........................ 701/23 |
| 2006/0089800 A1 * | 4/2006 | Svendsen et al. ............. 701/301 |
| 2007/0065002 A1 * | 3/2007 | Marzell et al. ................ 382/154 |
| 2007/0193798 A1 * | 8/2007 | Allard et al. .................. 180/169 |
| 2008/0009964 A1 * | 1/2008 | Bruemmer et al. ........... 700/245 |
| 2009/0063035 A1 * | 3/2009 | Mandel et al. ................ 701/202 |
| 2010/0013615 A1 * | 1/2010 | Hebert et al. ............... 340/425.5 |
| 2011/0043515 A1 * | 2/2011 | Stathis .......................... 345/419 |
| 2011/0054689 A1 * | 3/2011 | Nielsen et al. ................ 700/258 |
| 2011/0066303 A1 * | 3/2011 | Hara ................................ 701/1 |
| 2011/0082585 A1 | 4/2011 | Sofman et al. |
| 2012/0101719 A1 * | 4/2012 | Sung et al. .................... 701/409 |
| 2015/0012209 A1 * | 1/2015 | Park et al. ..................... 701/408 |

FOREIGN PATENT DOCUMENTS

| | | |
|---|---|---|
| JP | 2010-238217 A | 10/2010 |
| KR | 10-0843085 B1 | 7/2008 |
| KR | 2012-0046974 A | 5/2012 |

* cited by examiner

*Primary Examiner* — Thomas Tarcza
*Assistant Examiner* — Richard Goldman
(74) *Attorney, Agent, or Firm* — Harness, Dickey & Pierce, PLC

(57) ABSTRACT

In some example embodiments, a position recognition method of an autonomous mobile robot may include: dividing a grid map into a plurality of spaces; extracting, by a processor, learning data of each of the plurality of spaces; generating, by the processor, space models of each of the plurality of spaces using the extracted learning data; and/or recognizing, by the processor, a current position of the autonomous mobile robot based on the extracted learning data, the space models, and actual range scan data input through the autonomous mobile robot.

20 Claims, 18 Drawing Sheets

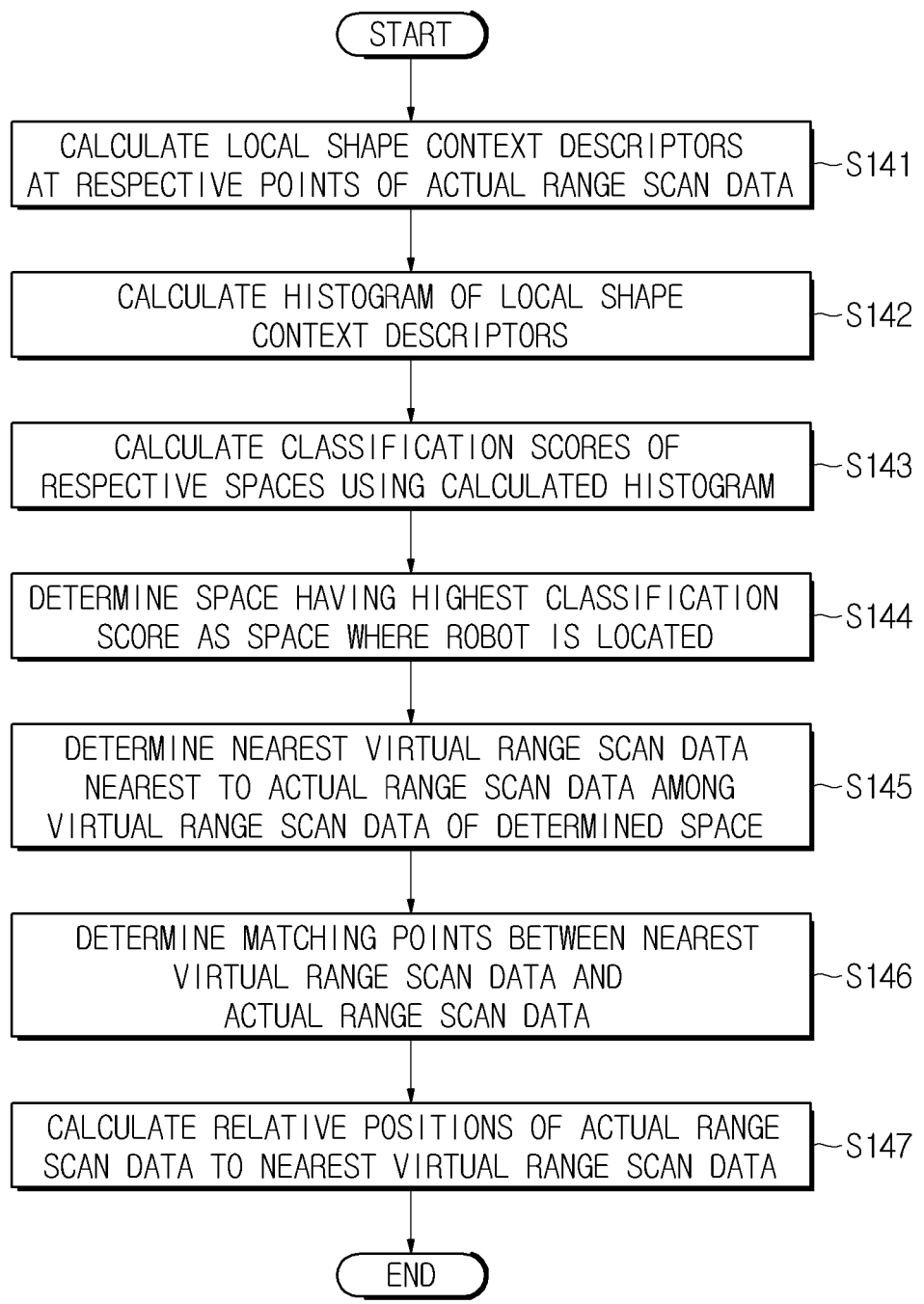

POSITION RECOGNITION METHODS OF AUTONOMOUS MOBILE ROBOTS

CROSS-REFERENCE TO RELATED APPLICATION(S)

This application claims priority from Korean Patent Application No. 10-2013-0077668, filed on Jul. 3, 2013, in the Korean Intellectual Property Office (KIPO), the entire contents of which are incorporated herein by.

BACKGROUND

1. Field

Some example embodiments may relate to position recognition methods of autonomous mobile robots in which the autonomous mobile robots may recognize the current position thereof in stopped states without unnecessary movement of the autonomous mobile robots.

2. Description of Related Art

In general, an autonomous mobile robot refers to a robot which may autonomously cope with an unknown environment without any prior knowledge. Such an autonomous mobile robot is widely used in various fields and, in place of a human, performs operations, for example, helping a handicapped person, transportation of goods in factories, and operation in dangerous environments, such as nuclear waste treatment plants or deep at sea. Moreover, an autonomous mobile robot may be used as an autonomous cleaner or an autonomous lawn mower.

In order to effectively provide services to humans, such an autonomous mobile robot must be capable of recognizing the position of the mobile robot in the environment within which the robot operates, particularly one including humans. Here, there are various position recognition methods of an autonomous mobile robot according to kinds of an environment map provided within the robot. Environment maps may include a feature map and a grid map. Among these environment maps, the grid map is most widely used.

A general position recognition method using the grid map is as follows. That is, positions on the grid map where an autonomous mobile robot will be located are estimated, all range scan data which may be acquired from the estimated positions is simulated, the most similar data to range scan data which is actually collected by the autonomous mobile robot using a range scan sensor is detected from among all simulated range scan data, and the estimated position generated from such data is recognized as the current position of the autonomous mobile robot.

However, in case of such a position recognition method, if the number of estimated positions is small, there is a possibility of failure of position recognition, and if the number of the estimated positions is large, calculation time for position recognition is increased. Further, since the autonomous mobile robot simulates range scan data at corresponding positions while continuously moving along the estimated positions and extracts range scan data similar to the actual range scan data, the above recognition method is ineffective.

SUMMARY

Some example embodiments may provide position recognition methods of autonomous mobile robots in which the autonomous mobile robots may rapidly and accurately recognize the current position thereof in stopped states without unnecessary movement of the autonomous mobile robots.

In some example embodiments, a position recognition method of an autonomous mobile robot may comprise: dividing a grid map into a plurality of spaces; extracting, by a processor, learning data of each of the plurality of spaces; generating, by the processor, space models of each of the plurality of spaces using the extracted learning data; and/or recognizing, by the processor, a current position of the autonomous mobile robot based on the extracted learning data, the space models, and actual range scan data input through the autonomous mobile robot.

In some example embodiments, the dividing of the grid map into the plurality of spaces may comprise: extracting, by the processor, a generalized Voronoi graph (GVG) from the grid map; extracting, by the processor, reference positions from the extracted GVG; classifying, by the processor, neighboring reference positions among the extracted reference positions into same groups, and providing same identification numbers to the extracted reference positions in the same groups; and/or propagating, by the processor, the same identification numbers as identification numbers provided to the extracted reference positions in the same groups to neighboring grid cells to which identification numbers are not provided, to divide the grid map into the plurality of spaces.

In some example embodiments, the extracting, by the processor, of the GVG may be performed using a brushfire algorithm.

In some example embodiments, the extracted reference positions may be points where three or more edges on the GVG intersect.

In some example embodiments, the classifying, by the processor, of the neighboring reference positions into the same groups may be performed using a spectral clustering algorithm.

In some example embodiments, the extracting, by the processor, of the learning data of each of the plurality of spaces may comprise: extracting, by the processor, a plurality of sample positions from each of the plurality of spaces; extracting, by the processor, virtual range scan data at each of the extracted plurality of sample positions; and/or extracting, by the processor, virtual local shape context descriptors of the extracted virtual range scan data.

In some example embodiments, the extracting, by the processor, of the virtual range scan data at each of the extracted plurality of sample positions may be performed by modeling a range scan sensor at the extracted plurality of sample positions and then applying a ray casting algorithm to the modeled range scan sensor.

In some example embodiments, the virtual range scan data may comprise a plurality of scan points.

In some example embodiments, a number of the plurality of scan points may be equal to a number of rays radiated from the modeled range scan sensor.

In some example embodiments, the extracting, by the processor, of the virtual local shape context descriptors may comprise: defining, by the processor, a local coordinate system of each of the plurality of scan points; defining, by the processor, a circle having a radius of a designated length based on an origin of the defined local coordinate system; and/or equally dividing, by the processor, the defined circle by a length in a radial direction and an angle in an angular direction.

In some example embodiments, the generating of the space models of each of the plurality of spaces may comprise: calculating, by the processor, virtual representative shape context descriptors using the extracted virtual local shape context descriptors; calculating, by the processor, a virtual histogram of the virtual representative shape context descriptors; and/or generating, by the processor, the space models of each of the plurality of spaces using the calculated virtual histogram.

In some example embodiments, the calculating, by the processor, of the virtual representative shape context descriptors may comprise: clustering, by the processor, the virtual local shape context descriptors into a plurality of clusters; and/or calculating, by the processor, a mean of the virtual local shape context descriptors in each of the plurality of clusters.

In some example embodiments, the clustering, by the processor, of the virtual local shape context descriptors into the plurality of clusters may be performed using a K-means clustering algorithm.

In some example embodiments, the calculating, by the processor, of the virtual histogram may be performed by approximating the virtual local shape context descriptors to one of the calculated virtual representative shape context descriptors.

In some example embodiments, an x-axis of the virtual histogram may represent identification numbers of the virtual representative shape context descriptors, and/or a y-axis of the virtual histogram may represent a number of the virtual representative shape context descriptors for which the virtual local shape context descriptors are approximated.

In some example embodiments, the recognizing, by the processor, of the current position of the autonomous mobile robot may comprise: calculating, by the processor, actual local shape context descriptors of actual range scan data input through the autonomous mobile robot; calculating, by the processor, an actual histogram of the calculated actual local shape context descriptors; calculating, by the processor, classification scores of each of the plurality of spaces using the calculated actual histogram and the space models; determining, by the processor, a space having a highest calculated classification score as a space where the autonomous mobile robot is located; determining, by the processor, nearest virtual range scan data that is nearest to the actual range scan data among the virtual range scan data of the determined space; determining, by the processor, matching points between the nearest virtual range scan data and the actual range scan data; and/or calculating, by the processor, relative positions of the actual range scan data to the nearest virtual range scan data.

In some example embodiments, the determining, by the processor, of the matching points between the nearest virtual range scan data and the actual range scan data may be performed by comparing the virtual local shape context descriptors of the nearest virtual range scan data and the actual local shape context descriptors of the actual range scan data with each other using a Hungarian method.

In some example embodiments, the calculating, by the processor, of the relative positions of the actual range scan data to the nearest virtual range scan data may be performed using a random sample consensus (RANSAC) algorithm.

In some example embodiments, a position recognition method of a robot may comprise: dividing a map into spaces; extracting, by a processor, learning data of the spaces; generating, by the processor, space models of the spaces using the extracted learning data; and/or recognizing, by the processor, a current position of the robot based on the extracted learning data, the space models, and actual range scan data.

In some example embodiments, the actual range scan data may be collected by the robot.

In some example embodiments, the actual range scan data may be collected by the robot at the current position of the robot.

In some example embodiments, the generating, by the processor, of the space models of the spaces using the extracted learning data may comprise calculating representative feature points in two-dimensional (2D) space.

In some example embodiments, the generating, by the processor, of the space models of the spaces using the extracted learning data may comprise calculating representative feature points in three-dimensional (3D) space.

BRIEF DESCRIPTION OF THE DRAWINGS

The above and/or other aspects and advantages will become more apparent and more readily appreciated from the following detailed description of example embodiments, taken in conjunction with the accompanying drawings, in which:

FIG. 9 is a flowchart concretely illustrating Operation S140 of FIG. 1.

DETAILED DESCRIPTION

Figure 1:
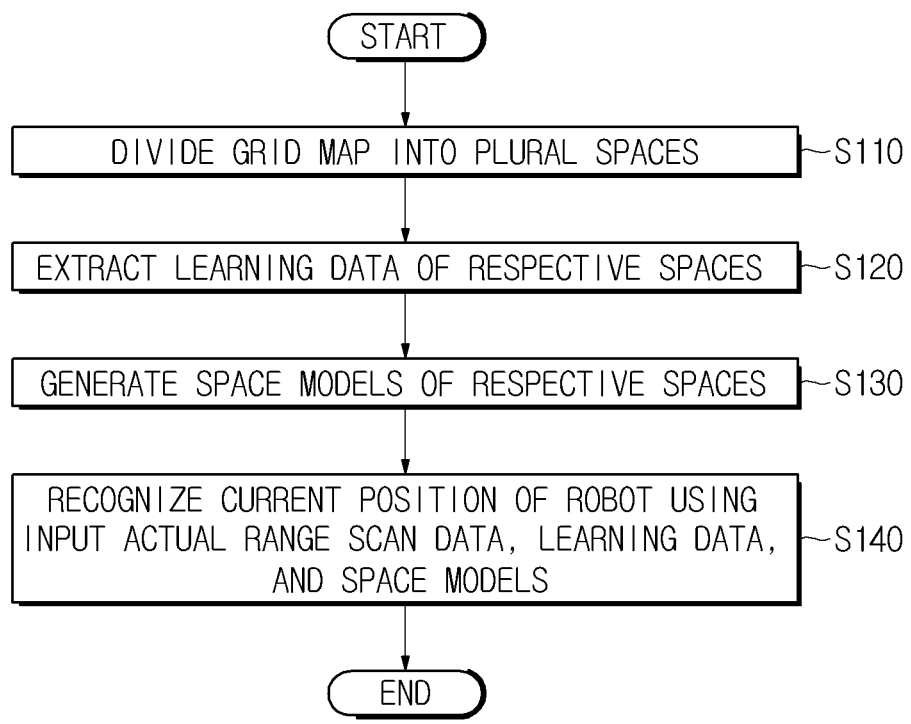
FIG. 1 is a flowchart sequentially illustrating a position recognition method of an autonomous mobile robot in accordance with some example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

Figure 10:
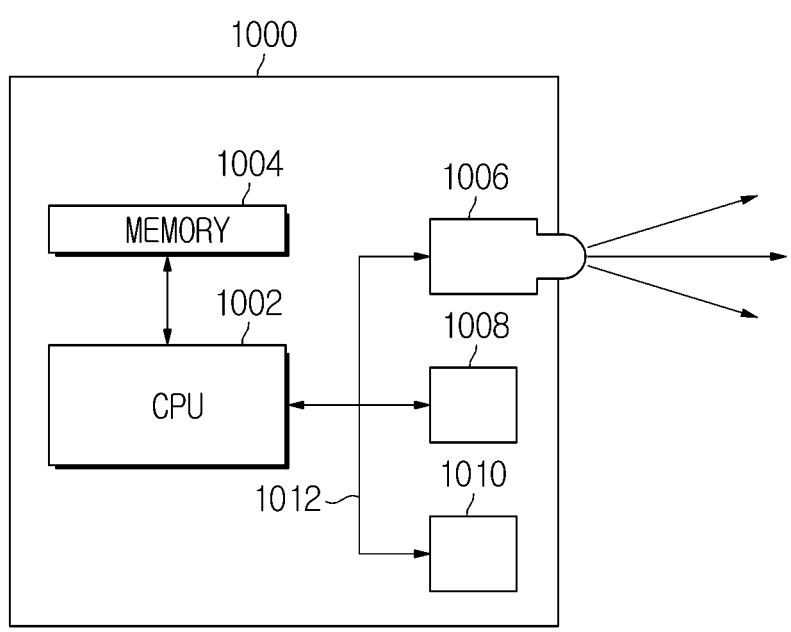
FIG. 10 is a block diagram of an autonomous mobile robot in accordance with some example embodiments.

FIG. 10 is a block diagram of an autonomous mobile robot in accordance with some example embodiments.

With reference to FIG. 10, autonomous mobile robot 1000 may comprise central processing unit (CPU) 1002, memory 1004, first subsystem 1006, second subsystem 1008, third subsystem 1010, and bus 1012. As shown in FIG. 10, bus 1012 may interconnect central processing unit (CPU) 1002, memory 1004, first subsystem 1006, second subsystem 1008, and third subsystem 1010. Memory 1004 may include, for example, a read-only memory (ROM) and/or a random-access memory (RAM).

First subsystem 1006 may comprise, for example, navigation equipment, such as dead-reckoning devices, electronic mapping systems, and/or range scan sensors (e.g., infrared, laser, sonar, or visual). Second subsystem 1008 may comprise, for example, communication and/or power equipment, such as audio, radio, and/or video components, and/or batteries, engines, generators, and/or motors. Third subsystem 1010 may comprise, for example, propulsion equipment, such as anchors, control surfaces, engines, propellers, propulsors, tractors, treads, and/or wheels.

CPU 1002 may exert control over one or more of first subsystem 1006, second subsystem 1008, and third subsystem 1010. CPU 1002 may exert control over first subsystem 1006 to cause autonomous mobile robot 1000 to execute a position recognition method using, for example, a range scan sensor. CPU 1002 may exert control over second subsystem 1008 to cause autonomous mobile robot 1000 to await a communication directing autonomous mobile robot 1000 to execute a position recognition method. CPU 1002 may exert control over second subsystem 1008 to cause batteries to power autonomous mobile robot 1000 in a quiet-operation mode. CPU 1002 may exert control over third subsystem 1010 to cause autonomous mobile robot 1000 to move in an X-axis direction, a Y-axis direction, a Z-axis direction, in roll, in pitch, and/or in yaw. CPU 1002 may exert control over third subsystem 1010 to cause autonomous mobile robot 1000 to move at constant velocity, to accelerate, to decelerate, and/or to stop.

Over the long term, grid maps may be stored, for example, in first subsystem 1006. When in use, CPU 1002 may copy or move the necessary grid map to memory 1004. A process for dividing the grid map into a plurality of spaces may be conducted as directed by computer programs stored in memory 1004 that are executed by CPU 1002.

FIG. 1 is a flowchart sequentially illustrating a position recognition method of an autonomous mobile robot in accordance with some example embodiments.

With reference to FIG. 1, in the position recognition method in accordance with this embodiment, first, a grid map provided within the autonomous mobile robot is divided into a plurality of spaces (Operation S110).

Here, the grid map is a map showing a surrounding environment of the autonomous mobile robot in a small grid structure for probabilistically expressing probabilities that an object will be present in respective grid cells. This is referred to as a probabilistic grid map.

As a well-known position recognition method using such a grid map, there is Monte Carlo localization. Such a method uses a particle filter to recognize of the position of the autonomous mobile robot, and estimated positions are represented as samples. That is, in conventional Monte Carlo localization using a grid map, when spreading of samples of a large number of estimated positions on the grid map at random, collection of range scan data at the respective samples while the autonomous mobile robot continuously moves, and convergence of the samples by comparing the collected range scan data with range scan data simulated at the positions of the samples are repeated, the samples are finally converged upon one point and the converged point is recognized as the current position of the autonomous mobile robot.

However, in case of such a position recognition method of the autonomous mobile robot, if the number of the samples is small, there is a possibility of a failure of position recognition, and if the number of the samples is large, calculation time for position recognition is increased. Further, since the autonomous mobile robot needs to continuously move so as to converge the samples upon one point, such a position recognition method is ineffective.

Therefore, in this embodiment, in order to more effectively and rapidly recognize the position of the autonomous mobile robot, first, the grid map is divided into a plurality of spaces (Operation S110). Hereinafter, a process of dividing the grid map into the plurality of spaces in accordance with this embodiment will be described in detail.

Figure 2:
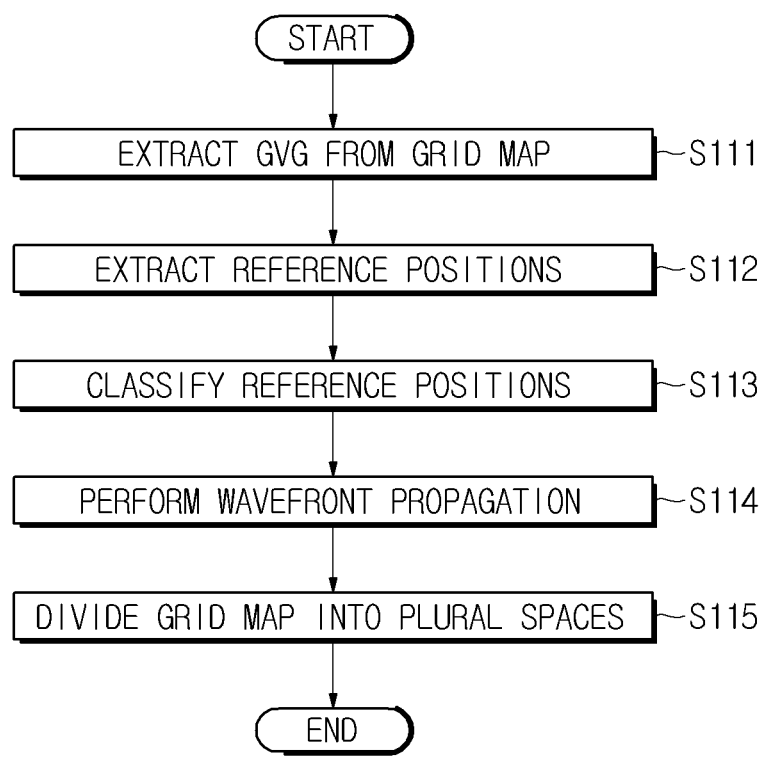
FIG. 2 is a flowchart concretely illustrating a process of dividing a grid map into a plurality of spaces.

FIG. 2 is a flowchart concretely illustrating a process of dividing a grid map into a plurality of spaces, and FIGS. 3A to 3F are views illustrating one example of division of the grid map into the plurality of spaces.

With reference to FIG. 2 and FIGS. 3A to 3F, in a process of dividing a grid map into a plurality of spaces in accordance with this embodiment, first, a generalized Voronoi graph (GVG) 110 (with reference to FIG. 3B) is extracted from a grid map 100 (with reference to FIG. 3A) (Operation S111).

In this embodiment, the GVG 110 may be extracted using a brushfire algorithm, but example embodiments and the extraction method of the GVG 110 are not limited thereto.

Figure 3A:
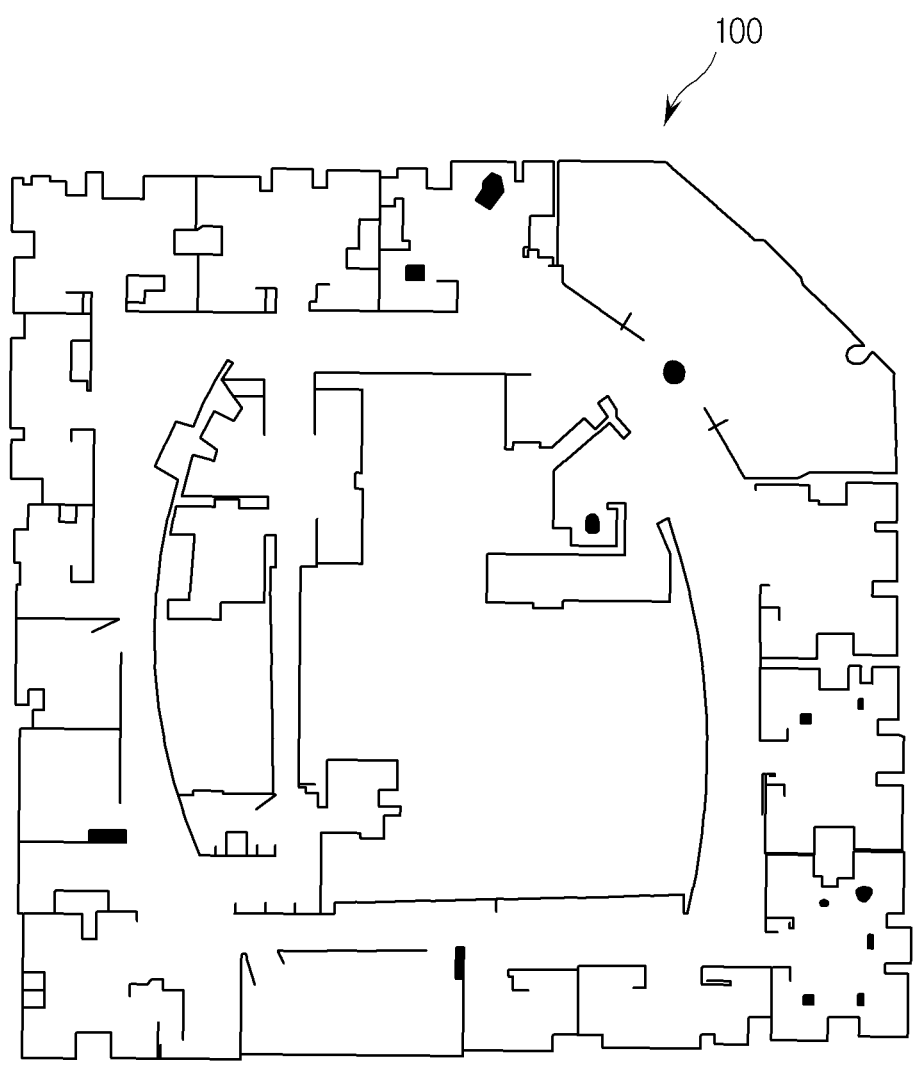
FIGS. 3A to 3F are views illustrating one example of division of the grid map into the plurality of spaces.
Figure 3B:
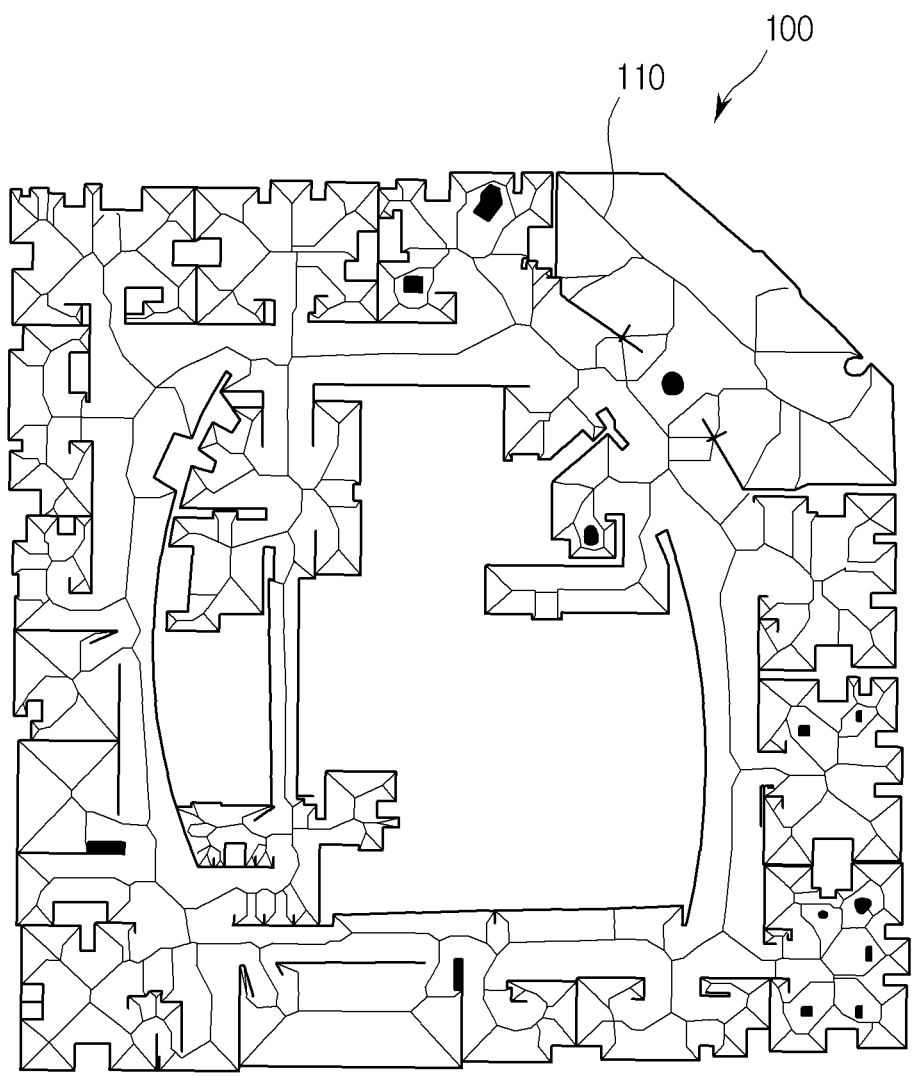
Figure 3C:
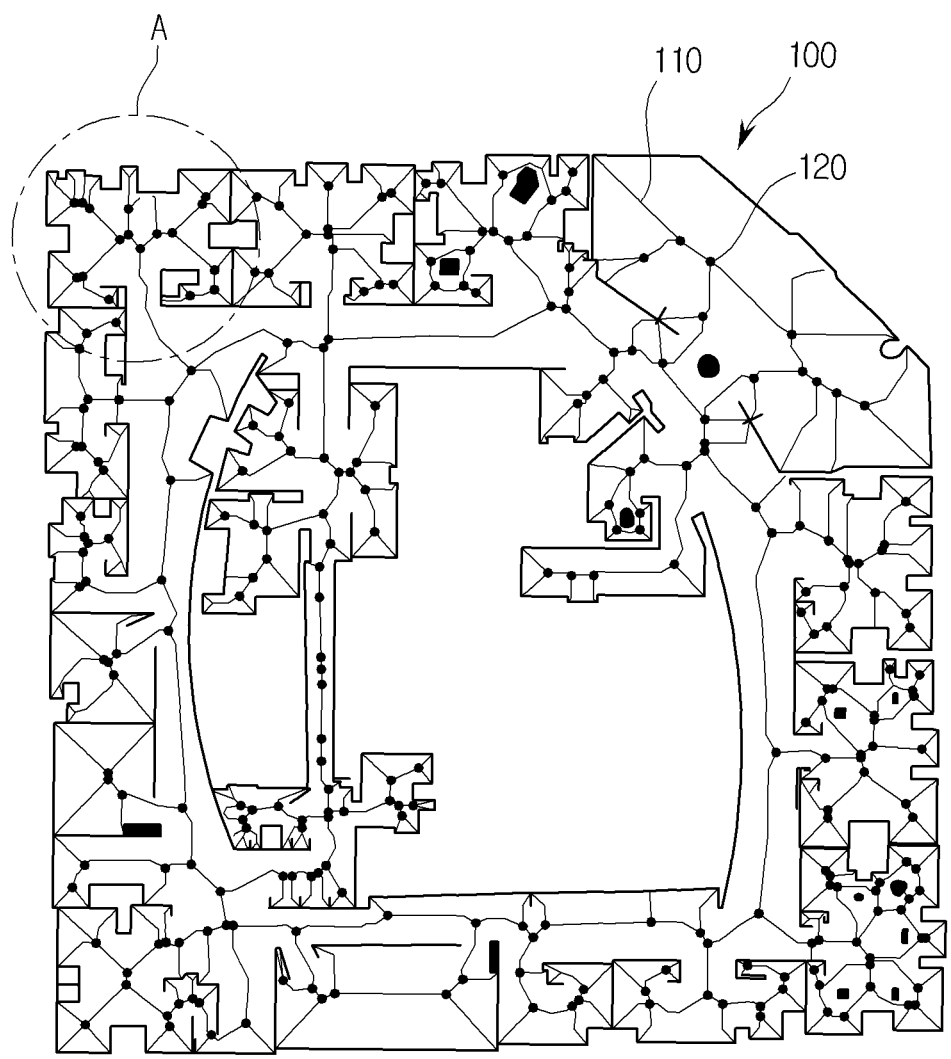

Thereafter, reference positions 120 (with reference to FIG. 3C) of spaces, which will be divided from the grid map 100, are extracted from the GVG 110 extracted through Operation S111 (Operation S112). Here, the reference positions 120 may be determined as points where three or more edges on the GVG 110 intersect, as exemplarily shown in FIG. 3C, but is not limited thereto. A close-up view of inset A of FIG. 3C is shown in FIGS. 3D-3F.

Thereafter, among the reference positions 120 extracted through Operation S112, reference positions 120 near to each other are classified into one group (Operation S113). Although, in this embodiment, the reference positions 120 are classified into groups using a spectral clustering algorithm, the method of classifying the reference positions 120 into groups is not limited thereto. Thereafter, the same identification number is provided to the reference positions 120 classified into one group. FIG. 3D illustrates one example of provision of the same identification number to the reference positions 120 classified into one group. With reference to FIG. 3D, as one example of provision of the same identification number to the reference positions 120 classified into one group, the same pattern is provided to the reference positions 120 classified into one group.

Figure 3D:
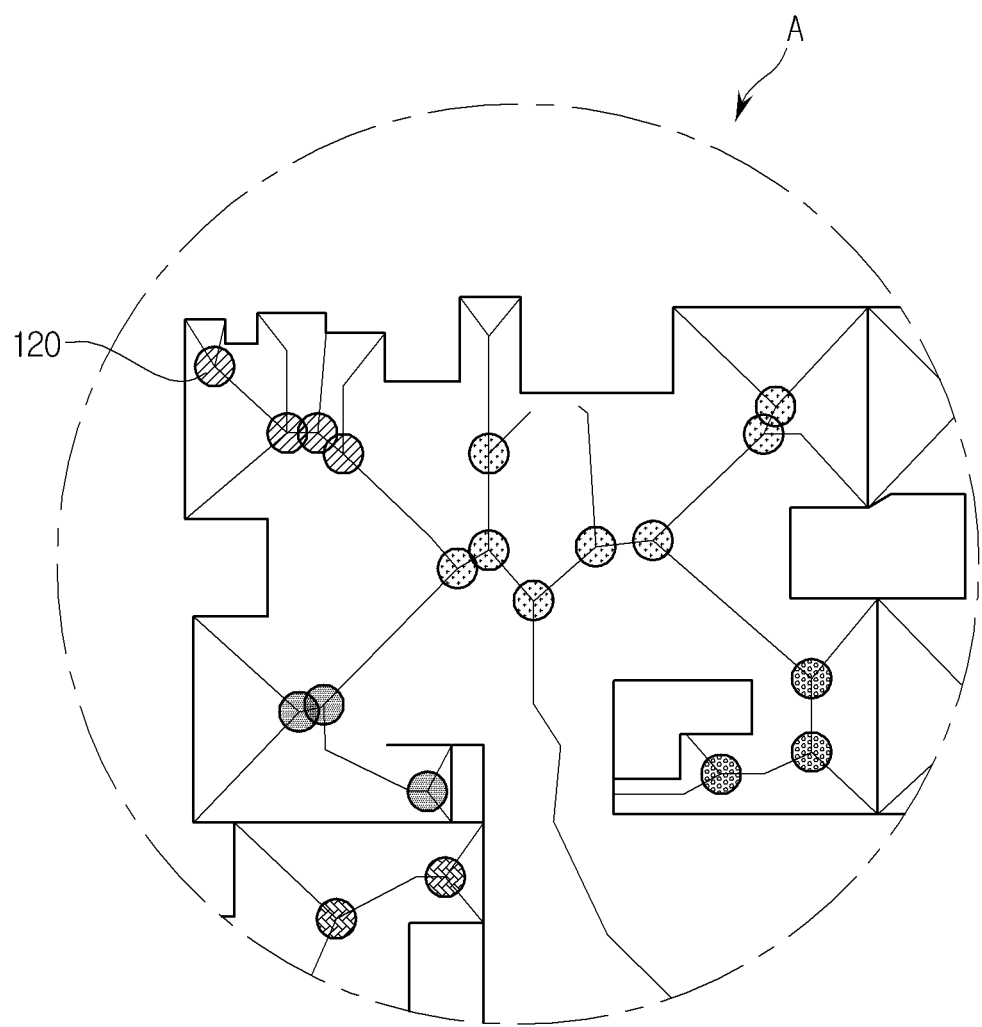
Figure 3E:
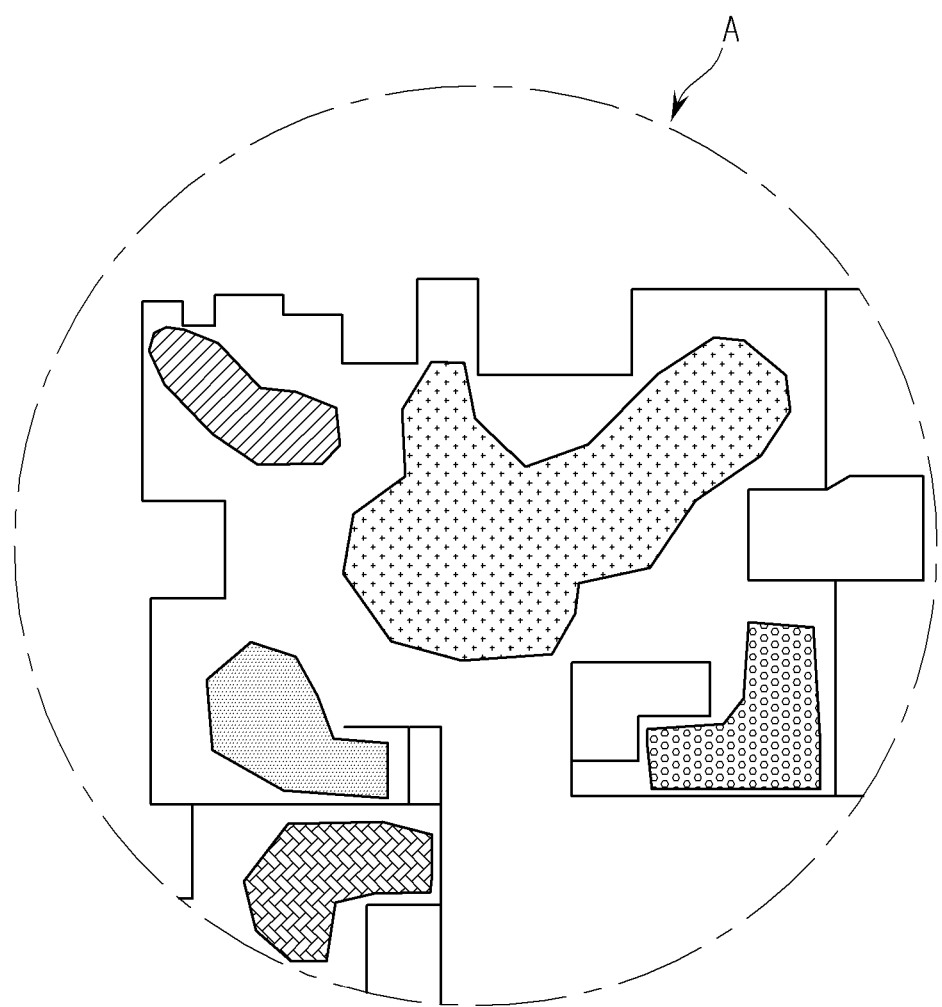

Thereafter, the same identification numbers as the identification numbers provided to the respective reference positions 120, as exemplarily shown in FIG. 3D, are repeatedly reproduced and propagated to neighboring grid cells to which identification numbers are not provided (Operation S114). FIG. 3E illustrates a state in which the same identification numbers as the identification numbers provided to the reference positions 120 are provided to the neighboring grid cells. As exemplarily shown in FIG. 3E, the neighboring grid cells, to which the same identification numbers as the identification numbers provided to the reference positions 120 are provided, repeatedly reproduce the same identification numbers and propagate the same identification numbers to neighboring grid cells. Such operation is repeated until the identification numbers are provided to all grid cells of the grid map 100, and is referred to as wavefront propagation.

Figure 3F:
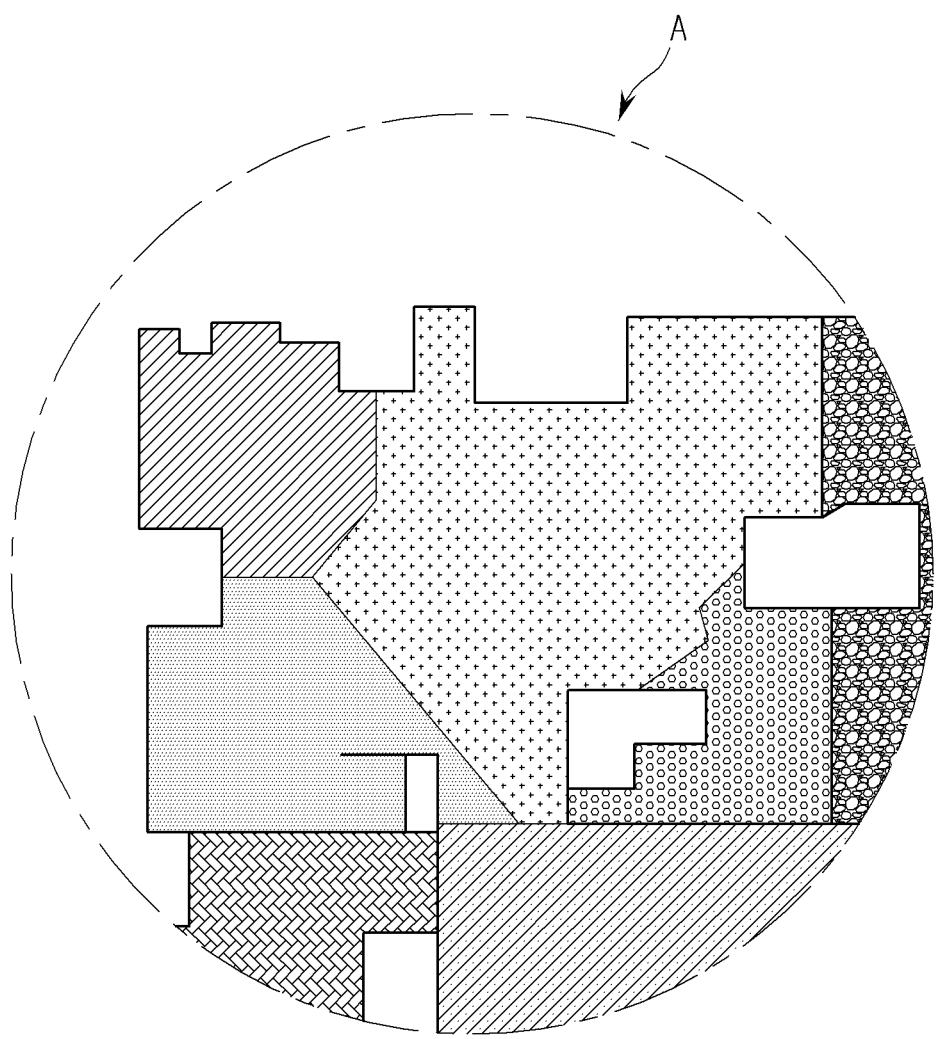

When wavefront propagation has been completed, the grid map 100 may be divided into a plurality of spaces including grid cells, each of which has the same identification number, as exemplarily shown in FIG. 3F (Operation S115).

Although this embodiment illustrates division of the grid map 100 into a plurality of spaces by extracting the GVG 110 from the grid map 100, extracting the reference positions 120 from the extracted GVG 110, classifying the extracted reference positions 120 into groups, providing the same identification number to the reference positions 120 of each of the groups, and performing wavefront propagation in which the same identification number is propagated to grid cells near to each of the reference positions 120, this is just one embodiment. The method of dividing the grid map 100 into a plurality of spaces is not limited thereto.

Thereafter, learning data of the respective spaces divided through Operation S110 is extracted (Operation S120).

Figure 4:
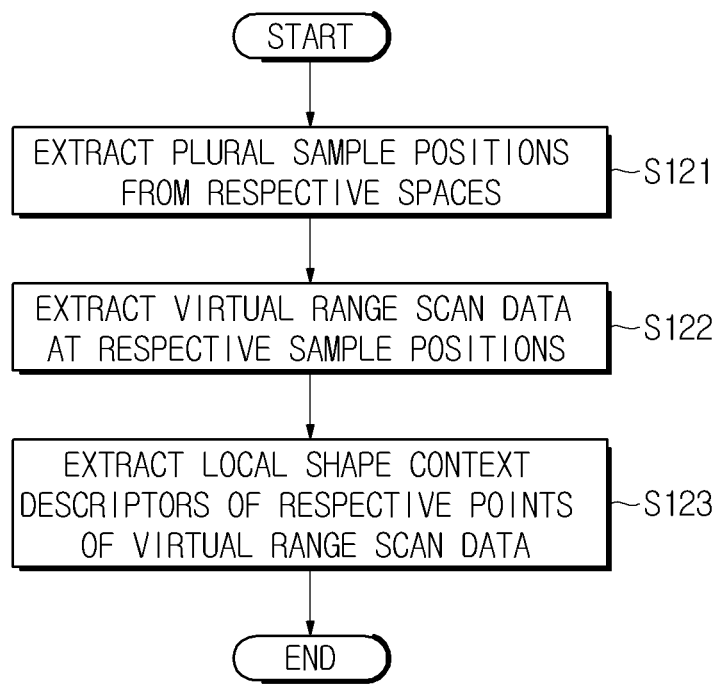
FIG. 4 is a flowchart concretely illustrating a process of extracting learning data of respective spaces.
Figure 5A:
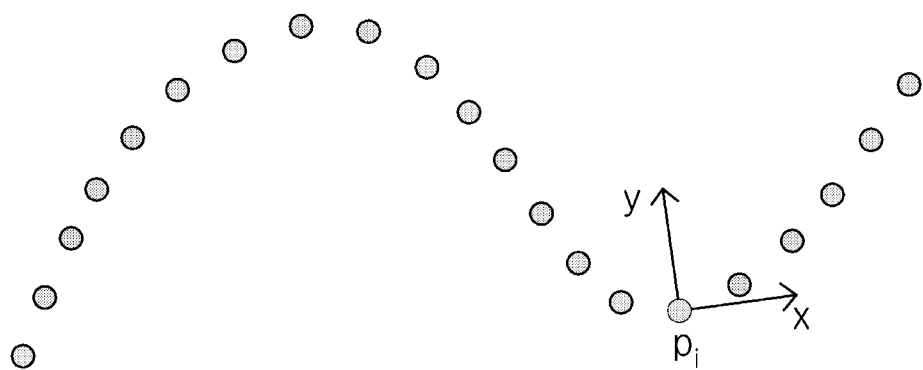
FIGS. 5A and 5B are views illustrating local coordinate systems of all points of virtual area scan data.
Figure 5B:
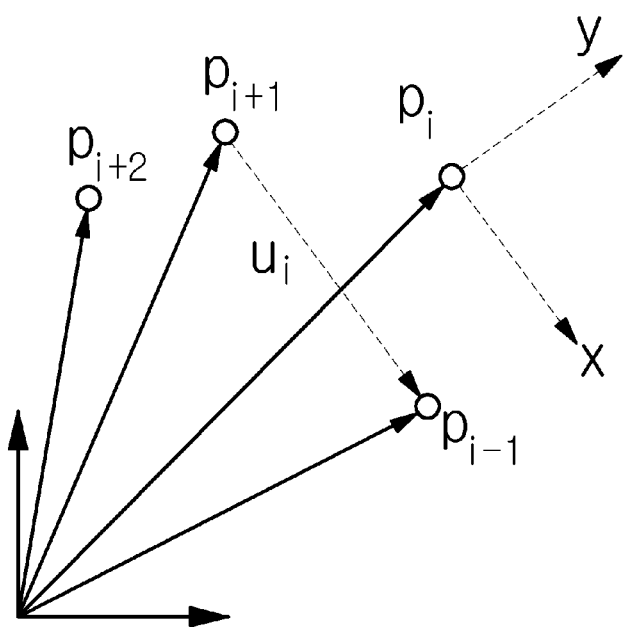
Figure 6:
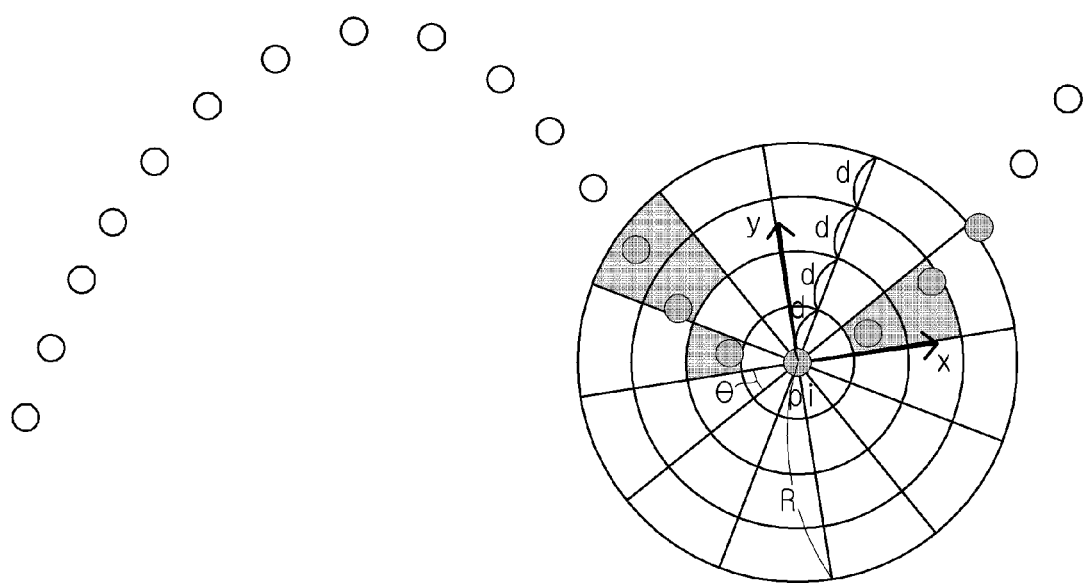
FIG. 6 is a view illustrating local shape context descriptors based on one point of the virtual area scan data.

FIG. 4 is a flowchart concretely illustrating a process of extracting learning data of respective spaces, FIGS. 5A and 5B are views illustrating local coordinate systems of all points of virtual area scan data, and FIG. 6 is a view illustrating local shape context descriptors based on one point of the virtual area scan data.

With reference to FIG. 4, a process of extracting learning data of respective divided spaces in this embodiment is as follows.

First, sample positions are extracted from the respective divided spaces at random (Operation S121). As the sample positions, a designated number of grid cells corresponding to random positions may be extracted from each of grid cell groups classified by the same identification numbers, i.e., each of the respective spaces, at random, but the sample positions are not limited thereto.

Thereafter, virtual range scan data at the respective extracted sample positions is extracted (Operation S122). In this embodiment, the virtual range scan data may be extracted by assuming that the autonomous mobile robot is located at a sample position extracted from the grid map, performing modeling of a range scan sensor at such a position, and employing a ray casting algorithm, but the method of extracting virtual range scan data is not limited thereto. The range scan sensor may employ a laser sensor, an ultrasound sensor, an infrared sensor, or a vision sensor, but is not limited thereto.

Further, the virtual range scan data extracted through Operation S122 is a group of scan points, and the number of the scan points may be equal to the number of rays radiated from the range scan sensor.

Thereafter, local shape context descriptors of all the scan points of the extracted virtual range scan data are extracted (Operation S123). Here, the number of the local shape context descriptors may be equal to the number of the scan points of the virtual range scan data. Hereinafter, in order to discriminate between local shape context descriptors of actual range scan data and local shape context descriptors of the virtual range scan data, the local shape context descriptors of the virtual range scan data will be named virtual local shape context descriptors.

In this operation, in order to extract the virtual local shape context descriptors, first, local coordinate systems of all scan points ($p_i$) of the virtual range scan data are defined, as exemplarily shown in FIGS. 5A and 5B. Although, in this embodiment, the local coordinate system of each scan point ($p_i$) may be defined in a method which will be described below, example embodiments are not limited thereto. For example, with reference to FIGS. 5A and 5B, a scan point ($p_i$) may serve as the origin of a local coordinate system, a tangential direction ($u_i$) calculated using Equation 1 below may be defined as the x-axis, and a direction perpendicular to the tangential direction ($u_i$) may be defined as the y-axis.

$$u_i = \frac{p_{i+1} - p_{i-1}}{\|p_{i+1} - p_{i-1}\|} \quad \text{[Equation 1]}$$

Thereafter, using the above-defined local coordinate system, a circle, the radius of which is R, is defined, and such a circle is equally divided by a length (d) in the radial direction and an angle (θ) in the angular direction, as exemplarily shown in FIG. 6. Each of divided regions has a pie shape, and the number and areas of the pies may be determined by the length (d) and the angle (θ) by which the circle is divided.

In this embodiment, dimensionality of the extracted virtual range shape context descriptors is equal to the number of the pies, i.e., the number of the divided regions, and the value allotted to each of dimensions of dimensionality corresponds to the number of the scan points which are within the area of the pie corresponding to such a dimension.

Thereafter, after the respective divided spaces are learned using the virtual local shape context descriptors extracted through Operation 123, space models of the respective spaces are generated (Operation S130).

Figure 7:
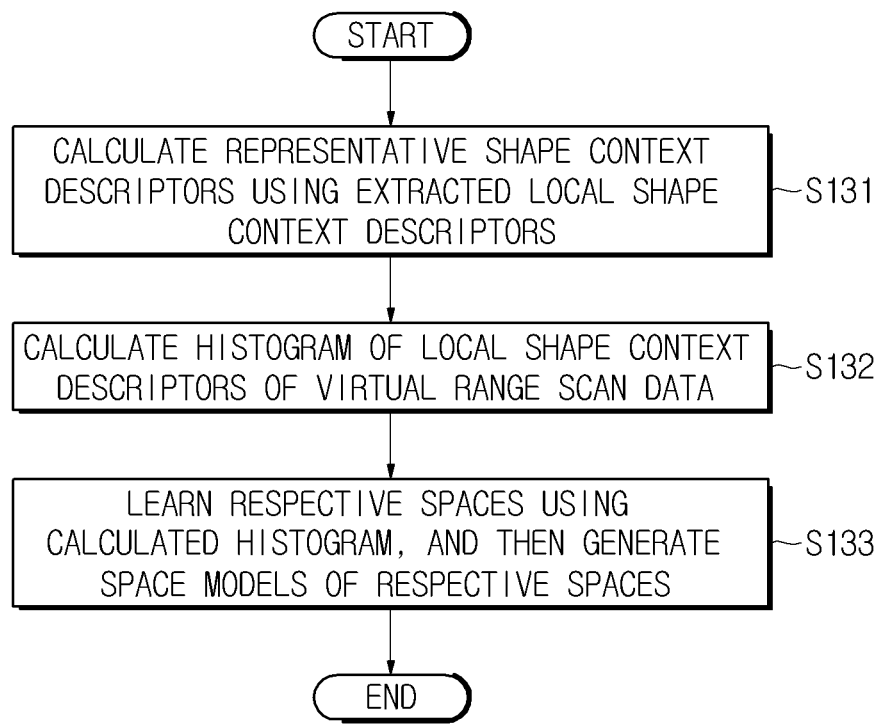
FIG. 7 is a flowchart concretely illustrating a process of generating space models of respective spaces.
Figure 8A:
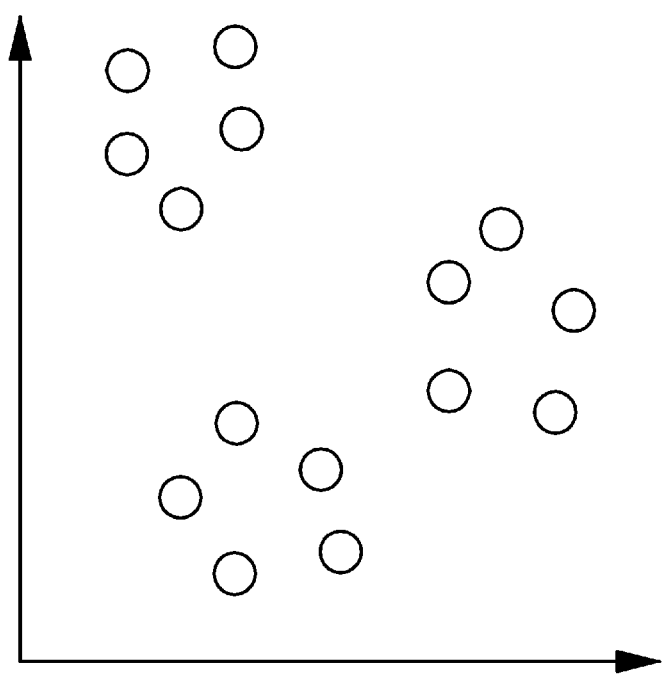
FIGS. 8A-8C are views illustrating one example of extraction of representative feature points of clusters.
Figure 8B:
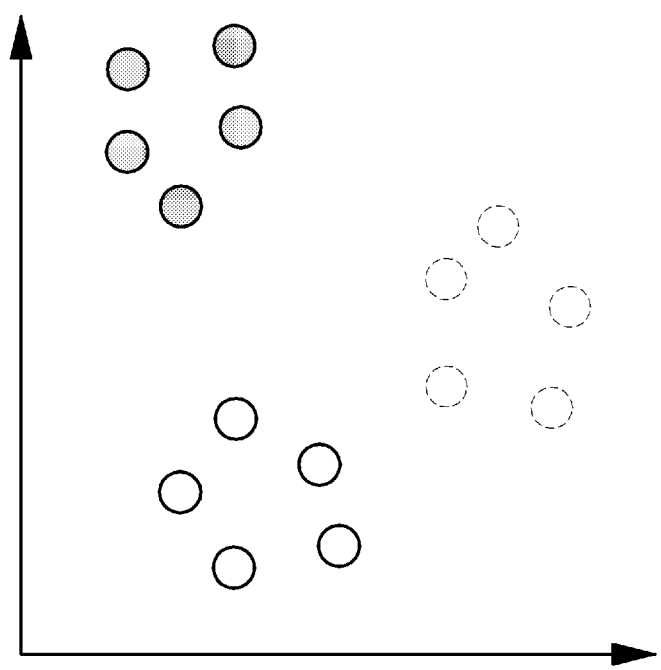
Figure 8C:
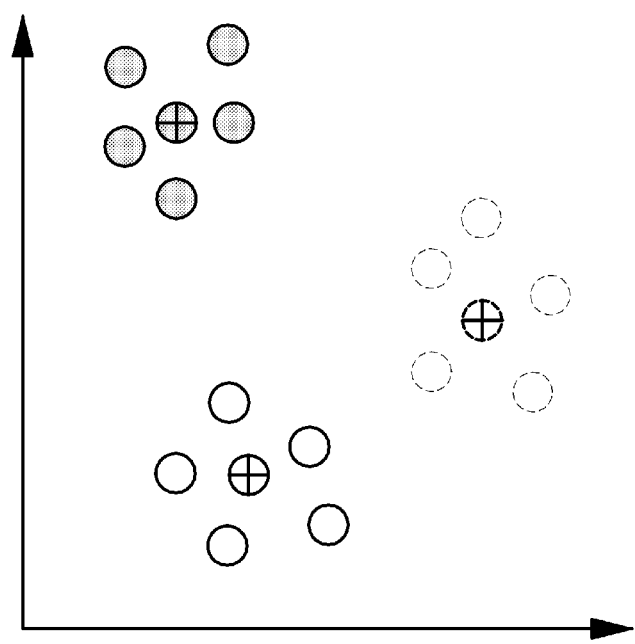

FIG. 7 is a flowchart concretely illustrating a process of generating space models of respective spaces, and FIGS. 8A-8C are views illustrating one example of extraction of representative feature points of clusters.

With reference to FIG. 7, a process of generating space models of respective spaces in this embodiment is as follows.

First, representative shape context descriptors (hereinafter, referred to as virtual representative shape context descriptors) are calculated using the virtual local shape context descriptors extracted through Operation S123 (Operation S131).

Since the number of the virtual local shape context descriptors extracted through Operation S123 is very large, learning of model parameters of the respective spaces using all of the virtual local shape context descriptors is ineffective.

Therefore, in this embodiment, virtual representative shape context descriptors approximating the extracted virtual local shape context descriptors are calculated. For example, three-dimensional (3D) virtual local shape context descriptors may be defined as feature points located in a 3D space. These feature points are clustered into clusters including adjacent feature points, and representative feature points becoming the means of the feature points in the respective clusters are calculated. Here, the representative feature points correspond to the virtual representative shape context descriptors.

FIGS. 8A-8C illustrate one example of a process of clustering feature points and calculating representative feature points. With reference to FIGS. 8A-8C, FIG. 8A illustrates feature points placed in a two-dimensional (2D) space, FIG. 8B illustrates one example of clustering of the feature points placed in the 2D space into three clusters, and FIG. 8C illustrates a result of calculation of representative feature points becoming the means of the feature points of the respective three clusters.

Although this embodiment may use a K-means clustering algorithm to cluster the virtual local shape context descriptors, the clustering method of the virtual local shape context descriptors is not limited thereto. In case of the K-means clustering algorithm, setting of K mean points at random positions, clustering of points adjacent to the mean points into K groups, setting of new mean points in the respective groups, and classification of points of the adjacent to the new mean points into groups are repeated.

Next, a histogram of the virtual local shape context descriptors of all of the virtual range scan data (hereinafter, referred to a virtual histogram) is calculated (Operation S132).

For example, on the assumption that the number of the scan points forming one piece of virtual range scan data is M, M virtual local shape context descriptors may be present, and in this embodiment, a virtual histogram of the M virtual local shape context descriptors is calculated.

In order to calculate the virtual histogram, first, the M virtual local shape context descriptors are approximated to one of K virtual representative shape context descriptors. For example, if the virtual local shape context descriptors and the virtual representative shape context descriptors are expressed as feature points in a D-dimension space, virtual representative shape context descriptors which are nearest to the virtual local shape context descriptors among the K virtual representative shape context descriptors may be determined as approximate values of the virtual local shape context descriptors.

Further, since the x-axis of the virtual histogram may represent the identification numbers of the virtual representative shape context descriptors and the y-axis may represent the number of the virtual representative shape context descriptors to which the virtual local shape context descriptors are approximated, the virtual histogram in this embodiment may have the shape of a K-dimension vector $h=(x_1, x_2, \ldots, x_k)$. For example, the virtual histogram of the virtual local shape context descriptors of the virtual range scan data, calculated through this operation, may be defined as $h_v=(x_{v1}, x_{v2}, \ldots, x_{vk})$. Here, the inferior v means virtual.

Thereafter, the respective spaces are learned using the virtual histogram calculated through Operation S132, and then, space models of the respective spaces are generated (Operation S133).

Although, in this embodiment, model parameters of the respective spaces may be learned using the virtual histogram through a support vector machine (SVM) learning algorithm, a learning algorithm which may be used is not limited thereto, and various machine learning algorithms which are well known in the art may be used.

The model of each space may be expressed as Equation 2 below and have the shape of a hyperplane in the K-dimension. Here, $a_1, a_2, \ldots, a_k$ (hereinafter, referred to as a vector w) and b are model parameters of the spaces.

$$a_1 x_{v1} + a_2 x_{v2} + a_k x_{vk} = b \quad \text{[Equation 2]}$$

As described above, in this embodiment, on the assumption that the autonomous mobile robot is located at sample positions selected at random in the respective spaces, the range scan sensor is modeled at the corresponding sample positions and the ray casting algorithm is applied to the modeled range scan sensor, thus extracting virtual range scan data. Therefore, in this embodiment, the virtual range scan data at the corresponding sample positions may be extracted without movement of the autonomous mobile robot to the corresponding sample positions, and thus, the autonomous mobile robot does not need to unnecessarily move.

Further, although, in this embodiment, all the virtual range scan data, the virtual local shape context descriptors of the respective virtual range scan data, the virtual histogram of the virtual local shape context descriptors, and the space models of the respective spaces, extracted by the above-described operations, may be provided as a database within the autonomous mobile robot, example embodiments are not limited thereto.

Thereafter, referring to FIG. 1 again, the current position of the autonomous mobile robot is recognized using input actual range scan data, the learning data extracted through Operation S120, and the space models generated through Operation S130 (Operation S140).

In brief, the position recognition process in accordance with this embodiment may be performed by determining a space where the autonomous mobile robot is currently located using the actual range scan data collected at the current position by the autonomous mobile robot and recognizing the accurate position of the autonomous mobile robot in the determined space.

Thereafter, with reference to FIG. 9, a process of determining a space where the autonomous mobile robot is located and recognizing the accurate position of the autonomous mobile robot in the determined space will be described.

As exemplarily shown in FIG. 9, a process of determining the space where the autonomous mobile robot is located is as follows.

First, local shape context descriptors of respective scan points of the actual range scan data collected by the autonomous mobile robot at the current position thereof (hereinafter, referred to as actual local shape context descriptors) are calculated (Operation S141).

The above-described actual range scan data may be collected using the range scan sensor provided on the autonomous mobile robot. The range scan sensor may employ a laser sensor, an ultrasound sensor, an infrared sensor, or a vision sensor, but is not limited thereto.

Further, the actual local shape context descriptors calculated in this operation may be calculated using the same method as the above-described calculation of the virtual local shape context descriptors of the virtual range scan data, and a detailed description thereof will thus be omitted.

Thereafter, a histogram of the actual local shape context descriptors (hereinafter, referred to as an actual histogram), calculated through Operation S141, is calculated (Operation S142). The actual histogram in this operation may be calculated using the same method as the above-described calculation of the histogram of the virtual local shape context descriptors of the virtual range scan data, and a detailed description thereof will thus be omitted.

For example, the actual histogram of the actual local shape context descriptors of the actual range scan data, calculated through this operation, may be defined as ha=$(x_{a1}, x_{a2}, \ldots, x_{ak})$.

Thereafter, classification scores of the respective spaces are calculated using the actual histogram calculated through Operation S142 and the space models of the respective spaces generated through Operation S133 (Operation S143), and the space having the highest classification score is determined as the space where the autonomous mobile robot is located (Operation S144).

In this embodiment, the above-described classification scores may be calculated using Equation 3 below.

$$S_i = w_i \times ha - b_i \quad \text{[Equation 3]}$$

Here, S represents a classification score, w and b represent model parameters of a space, $h_a$ represents an actual histogram of actual local shape context descriptors of actual range scan data, and i represents an identification number of the space. Here, i is equal to the number of spaces.

The space where the autonomous mobile robot is located is determined through above-described operations.

Thereafter, as exemplarily shown in FIG. 9, a process of recognizing the accurate position of the autonomous mobile robot in the determined space is as follows.

First, among the virtual range scan data of the space determined as the space where the autonomous mobile robot is located through Operation S144, the nearest virtual range scan data which is nearest to the actual range scan data is determined (Operation S145).

That is, virtual range scan data at each of the plural sample positions extracted from the respective spaces is extracted through Operation S121 and Operation S122. Among plural pieces of virtual range scan data extracted from the space determined through Operation S144, the nearest virtual range scan data which is nearest to the actual range scan data collected through the range scan sensor provided on the autonomous mobile robot is determined.

Although, in this embodiment, determination of the nearest virtual range scan data which is nearest to the actual range scan data may be exemplarily performed through a method described below, determination of the nearest virtual range scan data is not limited thereto.

For example, if the actual histogram of the actual local shape context descriptors of the actual range scan data is defined as ha=$(x_{a1}, x_{a2}, \ldots, x_{ak})$ and the virtual histogram of the virtual local shape context descriptors of the virtual range scan data extracted from the determined space is defined as $h_v = (x_{v1}, x_{v2}, \ldots, x_{vk})$, the virtual range scan data having the shortest distance, acquired by calculating a distance between h and $h_v$, may be determined as the nearest virtual range scan data which is nearest to the actual range scan data.

Thereafter, matching points between the nearest virtual range scan data determined through Operation S145 and the actual range scan data are determined (Operation S146).

That is, scan points of the actual range scan data matching scan points of the nearest virtual range scan data are determined. Although, in this embodiment, matching points between the virtual local shape context descriptors of the nearest virtual range scan data and the actual local shape context descriptors of the actual range scan data may be determined using the Hungarian method, determination of matching points is not limited thereto.

Thereafter, the position of the autonomous mobile robot is measured by calculating the relative positions of the actual range scan data to the nearest virtual range scan data using the matching points determined through Operation S146 (Operation S147).

Concretely, with reference to FIG. 4, since plural sample positions are extracted from the respective spaces (Operation S121) and virtual range scan data at the extracted sample positions is extracted (Operation S122), the positions at which all virtual range scan data is extracted, i.e., the sample positions, correspond to accurate positions which are already known. That is, since a position on the grid map at which the nearest virtual range scan data is extracted is already known, if the relative positions of the actual range scan data to the nearest virtual range scan data, the position of which is known, are calculated, a position on the grid map at which the actual range scan data may be extracted may be detected, and the corresponding position may be recognized as the position where the autonomous mobile robot is currently located.

Although, in this embodiment, the relative positions of the actual range scan data to the nearest virtual range scan data may be calculated using a random sample consensus (RANSAC) algorithm, calculation of the relative positions of the actual range scan data to the nearest virtual range scan data is not limited thereto.

As is apparent from the above description, a position recognition method of an autonomous mobile robot in accordance with some example embodiments, a given grid map is divided into a plurality of spaces, a plurality of sample positions is extracted from each of the divided spaces, and a plurality of pieces of virtual range scan data at each of the plural sample positions is extracted. Therefore, among the plurality of pieces of extracted virtual range scan data, the nearest virtual range scan data which is nearest to actual range scan data actually collected by the autonomous mobile robot is determined, and the relative positions of the actual range scan data to the determined nearest virtual range scan data are calculated, thereby recognizing the current position of the autonomous mobile robot.

In order to recognize the current position of the autonomous mobile robot using the grid map, such a position recognition method in accordance with some example embodiments does not require the autonomous mobile robot to directly collect range scan data while continuously moving so as to converge samples upon one point as in the conventional particle filter-based method, and may rapidly and accurately recognize the current position of the autonomous mobile robot on the grid map using only one actual range scan data collected by the autonomous mobile robot in a stoppage state in place.

While example embodiments have been particularly shown and described, it will be understood by those of ordinary skill in the art that various changes in form and details may be made therein without departing from the spirit and scope of the present invention as defined by the following claims.

What is claimed is:

1. A position recognition method of an autonomous mobile robot, the method comprising:
    obtaining actual range scan data using a range scan sensor of the autonomous mobile robot;
    dividing a grid map into a plurality of spaces;
    extracting, by a processor, learning data descriptive of each of the plurality of spaces;
    generating, by the processor, space models of each of the plurality of spaces using the extracted learning data; and
    recognizing, by the processor, a current position of the autonomous mobile robot based on the extracted learning data, the space models, and the actual range scan data.

2. The position recognition method according to claim 1, wherein the dividing of the grid map into the plurality of spaces comprises:
    extracting, by the processor, a generalized Voronoi graph (GVG) from the grid map;
    extracting, by the processor, reference positions from the extracted GVG;
    classifying, by the processor, neighboring reference positions among the extracted reference positions into same groups, and providing identical identification numbers to the extracted reference positions in the same groups, wherein each of the extracted reference positions in a same group can be identified by a unique position on the grid map and by an associated identical identification number; and
    propagating, by the processor, the identical identification numbers as identification numbers provided to the extracted reference positions in the same groups to neighboring grid cells to which identification numbers are not provided, to divide the grid map into the plurality of spaces;
    wherein the propagating of the identical identification numbers expands coverage of the grid map by a same group of the extracted reference positions with the associated identical identification number to include neighboring grid cells, of the same group of the extracted reference positions with the associated identical identification number, to which the identification numbers are not provided.

3. The position recognition method according to claim 2, wherein the extracting, by the processor, of the GVG is performed using a brushfire algorithm.

4. The position recognition method according to claim 2, wherein the extracted reference positions are points where three or more edges on the GVG intersect.

5. The position recognition method according to claim 2, wherein the classifying, by the processor, of the neighboring reference positions into the same groups is performed using a spectral clustering algorithm.

6. The position recognition method according to claim 1, wherein the extracting, by the processor, of the learning data descriptive of each of the plurality of spaces comprises:
    extracting, by the processor, a plurality of sample positions from each of the plurality of spaces;
    extracting, by the processor, virtual range scan data at each of the extracted plurality of sample positions; and
    extracting, by the processor, virtual local shape context descriptors of the extracted virtual range scan data.

7. The position recognition method according to claim 6, wherein the extracting, by the processor, of the virtual range scan data at each of the extracted plurality of sample positions is performed by modeling a range scan sensor at the extracted plurality of sample positions and then applying a ray casting algorithm to the modeled range scan sensor.

8. The position recognition method according to claim 6, wherein the virtual range scan data comprises a plurality of scan points.

9. The position recognition method according to claim 8, wherein a number of the plurality of scan points is equal to a number of rays radiated from the modeled range scan sensor.

10. The position recognition method according to claim 8, wherein the extracting, by the processor, of the virtual local shape context descriptors comprises:
    defining, by the processor, a local coordinate system of each of the plurality of scan points;
    defining, by the processor, a circle having a radius of a designated length based on an origin of the defined local coordinate system; and
    equally dividing, by the processor, the defined circle by a length in a radial direction and an angle in an angular direction.

11. The position recognition method according to claim 6, wherein the generating of the space models of each of the plurality of spaces comprises:
    calculating, by the processor, virtual representative shape context descriptors using the extracted virtual local shape context descriptors;
    calculating, by the processor, a virtual histogram of the virtual representative shape context descriptors; and
    generating, by the processor, the space models of each of the plurality of spaces using the calculated virtual histogram.

12. The position recognition method according to claim 11, wherein the calculating, by the processor, of the virtual representative shape context descriptors comprises:
    clustering, by the processor, the virtual local shape context descriptors into a plurality of clusters; and
    calculating, by the processor, a mean of the virtual local shape context descriptors in each of the plurality of clusters.

13. The position recognition method according to claim 12, wherein the clustering, by the processor, of the virtual local shape context descriptors into the plurality of clusters is performed using a K-means clustering algorithm.

14. The position recognition method according to claim 11, wherein the calculating, by the processor, of the virtual histogram is performed by approximating the virtual local shape context descriptors to one of the calculated virtual representative shape context descriptors.

15. The position recognition method according to claim 14, wherein an x-axis of the virtual histogram represents identification numbers of the virtual representative shape context descriptors, and a y-axis of the virtual histogram represents a number of the virtual representative shape context descriptors for which the virtual local shape context descriptors are approximated.

16. The position recognition method according to claim 6, wherein the recognizing, by the processor, of the current position of the autonomous mobile robot comprises:
 calculating, by the processor, actual local shape context descriptors of actual range scan data input through the autonomous mobile robot;
 calculating, by the processor, an actual histogram of the calculated actual local shape context descriptors;
 calculating, by the processor, classification scores of each of the plurality of spaces using the calculated actual histogram and the space models;
 determining, by the processor, a space having a highest calculated classification score as a space where the autonomous mobile robot is located;
 determining, by the processor, nearest virtual range scan data that is nearest to the actual range scan data among the virtual range scan data of the determined space;
 determining, by the processor, matching points between the nearest virtual range scan data and the actual range scan data; and
 calculating, by the processor, relative positions of the actual range scan data to the nearest virtual range scan data.

17. The position recognition method according to claim 16, wherein the determining, by the processor, of the matching points between the nearest virtual range scan data and the actual range scan data is performed by comparing the virtual local shape context descriptors of the nearest virtual range scan data and the actual local shape context descriptors of the actual range scan data with each other using a Hungarian method.

18. The position recognition method according to claim 16, wherein the calculating, by the processor, of the relative positions of the actual range scan data to the nearest virtual range scan data is performed using a random sample consensus (RANSAC) algorithm.

19. A position recognition method of an autonomous mobile robot, the method comprising:
 inputting actual range scan data to a processor of the autonomous mobile robot;
 dividing a grid map into a plurality of spaces;
 extracting, by the processor, learning data descriptive of each of the plurality of spaces;
 generating, by the processor, space models of each of the plurality of spaces using the extracted learning data; and
 recognizing, by the processor, a current position of the autonomous mobile robot based on the extracted learning data, the space models, and the actual range scan data.

20. A position recognition method of an autonomous mobile robot, the method comprising:
 dividing a grid map into a plurality of spaces;
 extracting, by a processor of the autonomous mobile robot, learning data descriptive of each of the plurality of spaces;
 generating, by the processor, space models of each of the plurality of spaces using the extracted learning data;
 recognizing, by the processor, a current position of the autonomous mobile robot based on the extracted learning data, the space models, and actual range scan data input through the autonomous mobile robot; and
 moving the autonomous mobile robot based on the recognized current position.

* * * * *